(12) United States Patent
Burcham et al.

(10) Patent No.: US 10,360,076 B1
(45) Date of Patent: Jul. 23, 2019

(54) PRIORITIZED REBALANCING OF DISTRIBUTED FILE SYSTEM

(71) Applicant: Sprint Communications Company L.P., Overland Park, KS (US)

(72) Inventors: Robert H. Burcham, Overland Park, KS (US); Geoffrey A. Holmes, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 266 days.

(21) Appl. No.: 15/287,299

(22) Filed: Oct. 6, 2016

(51) Int. Cl.
| | | |
|---|---|---|
| *G06F 9/50* | (2006.01) | |
| *G06F 9/54* | (2006.01) | |
| *G06F 3/06* | (2006.01) | |
| *H04L 29/08* | (2006.01) | |

(52) U.S. Cl.
CPC .......... *G06F 9/5088* (2013.01); *G06F 3/067* (2013.01); *G06F 3/0619* (2013.01); *G06F 3/0643* (2013.01); *G06F 3/0689* (2013.01); *G06F 9/54* (2013.01); *H04L 67/06* (2013.01); *H04L 67/1097* (2013.01)

(58) Field of Classification Search
CPC ........ G06F 9/5088; G06F 3/0619; G06F 9/54; G06F 3/067; G06F 3/0689; G06F 3/0643; H04L 67/1097; H04L 67/06
See application file for complete search history.

(56) References Cited

U.S. PATENT DOCUMENTS

| | | | | |
|---|---|---|---|---|
| 7,225,211 | B1 * | 5/2007 | Colgrove | G06F 16/185 707/693 |
| 7,293,133 | B1 * | 11/2007 | Colgrove | G06F 3/0608 711/111 |
| 8,127,095 | B1 * | 2/2012 | Colgrove | G06F 11/1435 711/162 |
| 2015/0092550 | A1 * | 4/2015 | Christian | H04L 47/31 370/235 |
| 2015/0106578 | A1 * | 4/2015 | Warfield | G06F 3/0613 711/158 |
| 2016/0321008 | A1 * | 11/2016 | Fang | G06F 3/061 |
| 2017/0090975 | A1 * | 3/2017 | Baracaldo Angel | G06F 9/4843 |

* cited by examiner

*Primary Examiner* — Uzma Alam

(57) ABSTRACT

A method of balancing the data stored in a distributed file system. The method comprises analyzing the distributed file system to identify a degree of transience of files in the file system, to identify storage categories of files as being one of write once or write a plurality of times, and to identify files that are a single minimum allocatable unit in size or less, where the analyzing is performed by a data balancing application. The method further comprises determining by the data balancing application a prioritized sequence of file migration manifests, where each file migration manifest identifies a file to be migrated, the source location of the file, and the destination location of the file, where the determining is performed based on the analysis and migrating files by the data balancing application as defined in the file migration manifests in the determined sequence.

20 Claims, 4 Drawing Sheets

PRIORITIZED REBALANCING OF DISTRIBUTED FILE SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Distributed file systems may provide an application programming interface (API) to users (e.g., applications executing on server computers) that presents a unified view. Said in other words, from the viewpoint of a user, a distributed file system may appear to be a single computer system or a single memory device. Behind the API, however, the distributed file system may comprise many separate server computers each mediating access to one or more disk drives or other memory devices. A master server may maintain a map or index that associates an abstract reference to stored data with the actual physical location of the data in one or more of the disk drives connected to the file serving computers.

A distributed file system may maintain multiple copies of the same files to promote the goals of reliability (reducing risk of loss of data) and fast access to data. In some cases, computing operation may be performed on the files executing on compute resources (e.g., logical processors) close to the data. Multiple copies of files can support the option of choosing to execute compute operations on the version of the file that is connected to a compute resource with the greatest amount of currently available processor bandwidth. Over time, as the files of a distributed file system grow and/or are deleted and as new memory devices are added to the distributed file system, the data in the distributed file system may become unbalanced. Thus, performing a balancing procedure (or a rebalancing procedure) may be desirably performed occasionally to locate data in a more balanced and processing efficient configuration. Regrettably, such balancing procedures in very large distributed file systems can take a long time, as long as several days, and can slow the access to the distributed file system due to loading on the processing power of the master server.

SUMMARY

In an embodiment, a method of balancing the data stored in a distributed file system is disclosed. The method comprises analyzing a distributed file system to identify a degree of transience of files in the file system, to identify storage categories of files as being one of write once or write a plurality of times, and to identify files that are a single minimum allocatable unit in size or less, where the distributed file system is implemented as at least one master server computer and a plurality of server computers, each server computer providing access to at least one disk drive memory, where the distributed file system comprises a plurality of copies of each file distributed to different disk drive memories and the master server computer maintains a map of storage locations of files in the distributed file system, where the analyzing is performed by a data balancing application that executes on the master server computer. The method further comprises determining by the data balancing application a prioritized sequence of file migration manifests, where each file migration manifest identifies a file to be migrated, the source location of the file, and the destination location of the file, where the determining is performed based on the analysis and migrating files by the data balancing application as defined in the file migration manifests in the determined sequence. Each file is migrated by a thread of execution that is launched by the data balancing application to migrate the file according to the associated manifest.

In another embodiment, a master server computer system for mediating access to and for balancing data in a distributed file system is disclosed. The system comprises a non-transitory memory at least one processor, and a data balancing application stored in the non-transitory memory. When executed by the processor, the data balancing application analyzes a distributed file system to identify a degree of transience of files in the file system, to identify storage categories of files in the file system as being one of write once or write a plurality of times, and to identify files that are a single minimum allocatable unit in size or less, where the distributed file system comprises a plurality of server computers, each server computer providing access to at least one disk drive memory, where the distributed file system comprises a plurality of copies of each file distributed to different disk drive memories, where the master server computer system maintains in the non-transitory memory a map of storage locations of files in the distributed file system. The data balancing application further determines a prioritized sequence of file migration manifests, where each file migration manifest identifies a file to be migrated, the source location of the file, and the destination location of the file, where files being of the write once storage category are not provided a file migration manifest and migrates files as defined in the file migration manifests in the determined sequence.

In yet another embodiment, another method of balancing the data stored in a distributed file system is disclosed. The method comprises identifying a storage category of a plurality of files in a distributed file system as a write once storage category or a write a plurality of times storage category, where the identifying is performed by a data balancing application executing on a master server computer of the distributed file system, where the distributed file system comprises the master server computer and a plurality of server computers, each server computer providing access to at least one disk drive memory, the distributed file system comprising a plurality of copies of files distributed to different disk drive memories, and the master server maintains a map of storage locations of files in the distributed file system. The method further comprises identifying by the data balancing application files in the distributed file system that are a single minimum allocatable unit in size or less and determining by the data balancing application a frequency of writing for files that belong to the write a plurality of times storage category. The method further comprises determining by the data balancing application a prioritized sequence of file migrations for files that are larger than a single minimum allocatable unit in size and that belong to the write a plurality of times storage category based on the determined frequency of writing to the files and based on the, where files that are written to more frequently are prioritized for earlier migration than files that are written to less frequently.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
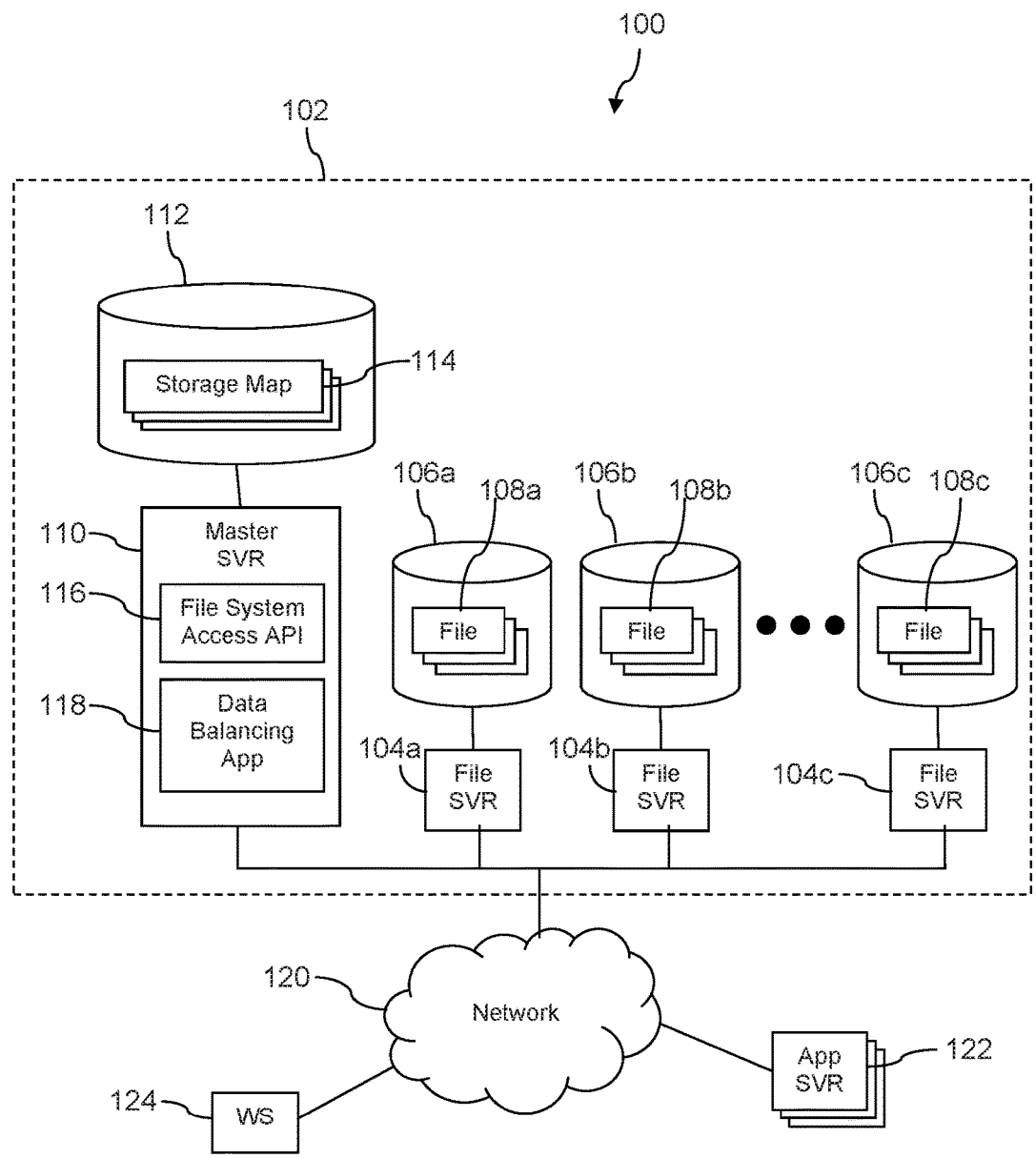
FIG. 1 is a block diagram of a distributed file system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a prioritized rebalancing system and method for distributed file systems. As distributed file systems are used and/or grow over time, the data in the distributed file systems may become unbalanced. Data is balanced when most files are duplicated two or more times in the memory resources and when the duplications of files are dispersed. Dispersed means the copies of a file are not stored on the same disk drive such that a failure of a single disk drive can make the file unavailable. Dispersed may mean the copies of a file are not stored on disk drives that are mediated by the same server computer such that a failure of a single server can make the file unavailable. Dispersed may mean the copies of a file are not stored on disk drives that are mediated by server computers in the same equipment rack such that a failure of a power supply in a single equipment rack can make the file unavailable. It is observed that keeping copies of a file dispersed can be desirable when compute operations are performed on the file in the distributed file system itself, by an application executing on a server computer proximate to the memory storing a copy of the file. For example, if copies of a file are dispersed, if a compute operation on the file is desired but a first server computer mediating access to a first copy of the file located on a first disk drive is busy, rather than waiting on the first server to become free for compute operations the compute operations may be performed by a second server computer mediating access to a second copy of the same file located on a second disk drive. Alternatively, parallel processing on the same file based on dispersed copies of the same file may be performed concurrently by different servers mediating access to different disk drives which contain copies of the file.

Rebalancing involves migrating data files in the distributed file system to improve the dispersion of the data files. Rebalancing can involve consolidating files that have become distributed piecemeal across multiple sectors of a disk, to make the file blocks contiguous on a disk. Rebalancing can involve consolidating a plurality of minimum allocatable units into a fewer number of minimum allocatable units. For example, when a file is first written it may completely fill a first minimum allocatable unit. Later when data is appended to the file, a second allocatable unit may be allocated to the file and written to. Later still, data may be deleted from the first minimum allocatable unit. Over time, the file may extend to 10 minimum allocatable units but, due to deletions of data in the file, the data could be redistributed to 7 minimum allocatable units. A minimum allocatable unit of disk memory is the smallest number of contiguous memory locations of the disk that may be allocated to a file. This may be some number of bytes such as a kilobyte (typically a power of 2, hence 1024 bytes), two kilobytes, four kilobytes, or some other minimum number of bytes. Rebalancing may be performed when new disk drives and/or file servers are added to the distributed file system to expand system capacity. Rebalancing may be performed when a dispersion factor drops below a minimum dispersion metric threshold. Rebalancing may be performed when initiated by a technician or administrator.

Rebalancing a distributed file system in the prior art may take a long time. The rebalancing is typically managed by the master server that maps abstract references to files to physical location of files on disk drives and to the server computers that mediate access to those disk drives. Rebalancing may be performed while user applications executing on remote servers (i.e., servers not part of the distributed file system) continue accessing the distributed file system, thereby competing for processing cycles of the master server and the file servers. In a 4 petabyte ($4 \times 10^{15}$ bytes or 4 million gigabytes) distributed file system, rebalancing in conformity with the prior art may take on the order of three days to complete. While rebalancing is underway, performance of the distributed file system may be diminished, for example latencies and/or delays for data access may be experienced by user applications.

The present disclosure teaches new tactics and methods for rebalancing a distributed file system. These teachings describe improvements to computer technology in that a distributed electronic file system is necessarily embodied in a computer system (i.e., computer technology) and the teachings relate to improved rebalancing processes and methods. In some cases, implementation of the rebalancing system and methods taught herein may reduce a rebalancing cycle from 2 or more days to 6 hours or less.

Rebalancing can be abstracted as comprising two steps: a first step of identifying a file migration and a second step of performing the file migration. The present disclosure teaches identifying files to be migrated by selecting what files are to be migrated and identifying a prioritized order for performing the migration. The high level tactics of this new approach are to avoid migrating files that don't need to be rebalanced and to migrate those files first that are most in need of being rebalanced.

In a distributed file system, some files and/or whole directories comprising multiple files are short lived. These files, for example, may comprise temporary files and/or scratch pad type files. Such short lived files may be deleted from the distributed file system by a user application executing on a remote server within 1 hour of original creation, within 2 hours of original creation, or within 4 hours of original creation. The present disclosure teaches selectively avoiding migrating short lived files. In a distributed file system, some files may be of a nature to be written once only. It is assumed that these write-once type files are balanced when they are written and remain balanced because they are not subject to subsequent writes or updates. The present disclosure teaches selectively avoiding migrating write-once type files. Some files comprise only a single minimum allocatable unit and hence are inherently balanced. The present disclosure teaches selectively avoiding migrating files that comprise only a single minimum allocatable unit.

The other files in the distributed file system that are not exempted from migration for the above reasons may be analyzed to determine a degree of transience of each file or, in other words, an expected lifetime of the file or duration of the file. This transience may be associated with a directory. For example, the length of life of each of the files (difference between current date and an inception date of each file) in the directory may be determined and an average life expectancy derived from that determination. This may be deemed the expected file duration of the files in that directory. The transience of files may be represented by expected file duration in a time unit. Alternatively, files may be categorized into transience classes such as short lived, medium lived, and long lived or according to some other categorization. A migration task or manifest may be defined for each of these remaining files that identifies where the files are stored and where they are to be migrated to. These tasks or manifests may then be assigned a migration priority.

Migration priority may be established on a plurality of different bases. Priority can be based in part on a degree of transience of a file. Priority can be based in part on a length of a file (on the assumption that longer files are likely to be more susceptible to fragmentation). Priority can be based in part on an assessment of the frequency the file is accessed. Priority can be based in part on an assessment of the importance of applications that commonly access to the file. Other priority factors known to those of skill in the art may be used in combination with the above factors to establish migration priority. In an embodiment, a priority score may be calculated as a sum of weighted priority factors. Each separate priority factor could be scored for a given file, automatically. Each different priority factor could have a weighting coefficient assigned to it.

A balancing application executing on the master server may perform the above analyses, manifest creations, and manifest priorities. The balancing application may be commanded by a user interface such as an administrator work station to perform balancing. Alternatively, the balancing application may be activated in response to a file dispersion metric falling below a predefined threshold or in response to a periodic schedule for rebalancing. In an embodiment, the balancing application may be provided some boundaries to operate within. For example, the balancing application may be directed to balance the upper 30 percent by prioritization of migration manifests, the upper 50 percent by prioritization, or the upper 70 percent by prioritization. Alternatively, the balancing application may be directed to perform balancing for a set period of time, migrating files in priority order until the predefined period of time expires. The balancing application may further be instructed to restrict its load or processing burden on the master server to a defined level, for example less than 10% of CPU utilization, less than 20% of CPU utilization, or some other upper threshold of CPU utilization on the master server. The balancing application may accomplish file migration by spawning threads that perform the actual migration of files based on the migration manifests.

Turning now to FIG. 1, a computer system 100 is described. In an embodiment, system 100 comprises a distributed file system 102, a network 120, a plurality of application servers 122, and an administrator workstation 124. Applications executing on the application servers 122 are linked to the distributed file system 102 by the network 120. The applications may create, read, update, and destroy data files in the distributed file system 102, possibly subject to authentication and authorization restrictions imposed by the distributed file system 102. The administrator workstation 124 may be used to administer the distributed file system 102, for example to initiate and control rebalancing of the distributed file system 102. The network 120 comprises one or more public networks, one or more private networks, or a combination thereof.

In an embodiment, the distributed file system 102 comprises a plurality of file servers 104, each file server 104 mediating access to at least one disk drive 106 or other memory device. The disk drives 106 may store files 108. FIG. 1 shows an exemplary first file server 104a mediating access to a first disk drive 106a that stores a plurality of files 108a; a second file server 104b mediating access to a second disk drive 106b that stores a second plurality of files 108b; and a third file server 104c mediating access to a third disk drive 106c that stores a third plurality of files 108c. While a single disk drive 106 is shown coupled to each file server 104 in FIG. 1, it is understood a file server 104 may mediate access to two disk drives 106, three disk drives 106, five disk drives 106, ten disk drives 106, or any number of disk drives 106. If is understood that the files 108 may comprise two or more copies of the same file, for redundancy in support of robust reliability and to support flexible computing on data stored in the files 108. It is understood that application code may be executable on the file servers 104 to provide localized computing on the data stored in the files 108.

The distributed file system 102 further comprises at least one master server 110 that maps abstract references to files and data in the files to physical addresses or references to the files and data stored in the disk drives 106 and to identities and/or addresses of the file servers 104 that mediate access to the subject disk drives 106. While a single master server 110 is illustrated for convenience sake in FIG. 1, the master server 110 may desirably be implemented as two or more servers to promote reliability and fail-over processing capability, whereby to avoid a failure of one master server computer interrupting access by the application servers 122 to the entire distributed file system 102.

The master server 110 maintains storage maps 114 in a data store 112. Each storage map 114 contains information about one of the files 108. This information may comprise locating or reference information on each of the copies of the one of the files 108, for example the file server and associated disk drive storing a first copy of the file, the file server and associated disk drive storing a second copy of the file, and the file server and associated disk drive storing a third copy of the file. This information may comprise a file initiation or inception date and time and a file last touched data and time. This information may comprise an owner and/or user of the file. This information may comprise a size of the file. In an embodiment, the precise mapping of a file 108 onto a disk drive 106 (identifying sectors and/or minimum allocatable units on the disk drive 106) may be maintained by the subject file server 104 that mediates access to the disk drive 106. Alternatively, the mapping of a file 108 onto a disk drive 106 is maintained by the storage map 114. The master server 110 executes a file system access application programming interface (API) 116 (i.e., a computer program that extends the API) to handle create, read, update, and delete requests from application servers 122.

A data balancing application 118 may execute on the master server 110, for example when a periodic schedule event fires, when a status metric of the distributed file system 102 exceeds or falls below a predefined threshold, or when launched manually from the administrator workstation 124. The data balancing application 118 may determine statistical information about the distributed file system 102, for example average life times of files 108 and/or average life times of files 108 for each directory. The data balancing application 118 may analyze the files 108 in the distributed file system 102 to determine a file or data dispersion metric. The file dispersion metric may be determined based on on the locations of copies of the same files with reference to location of the copies on disk drive memories coupled to the same server computers and based on the locations of copies of the same files with reference to location of the copies on disk drive memories coupled to different server computers located in a same equipment rack.

The data balancing application 118 may analyze the files 108 to identify files and/or directories that are temporary or scratch pad type files. The data balancing application 118 may analyze the files 108 to identify files that are write once type files or write a plurality of times type files. The data balancing application 118 may analyze files 108 to identify files that are a single minimum allocatable unit in size or less. Some of the analysis of the distributed file system 102 may not be repeated. For example, a write once category of a file 108 may be determined once. Average lifetimes of files and/or of file directories may be determined once or may be analyzed and revised less frequently than the file dispersion metric is determined.

Having analyzed the distributed file system 102, the data balancing application 118 is in a position to be able to create a prioritized sequence of file migration manifests or tasks. The write once category of files, the temporary type of files, and the files that are a single minimum allocatable unit of size or less may be excluded from inclusion on the file migration manifests. The data balancing application 118 may determine file migration manifests for remaining files 106 based on their contribution to file dispersion (or the lack of file dispersion) and determine a priority sequence of each of the file migration manifests based on the longevity of those remaining files 108.

Having established the sequence of migration manifests, the data balancing application 118 may launch a plurality of threads to perform the migration in the order of the sequence. The workstation 124 may have been used to configure bounds for the data file migration activity, for example configuring a maximum time duration for the migration, a maximum percentage of files to migrate, and/or a maximum processing load to impose on the master server 110.

In an embodiment the distributed file system 102 is a Hadoop distributed file system (HDFS). In an embodiment, the distributed file system 102 comprises in excess of 1 petabyte (1 million gigabytes) of data.

Figure 2:
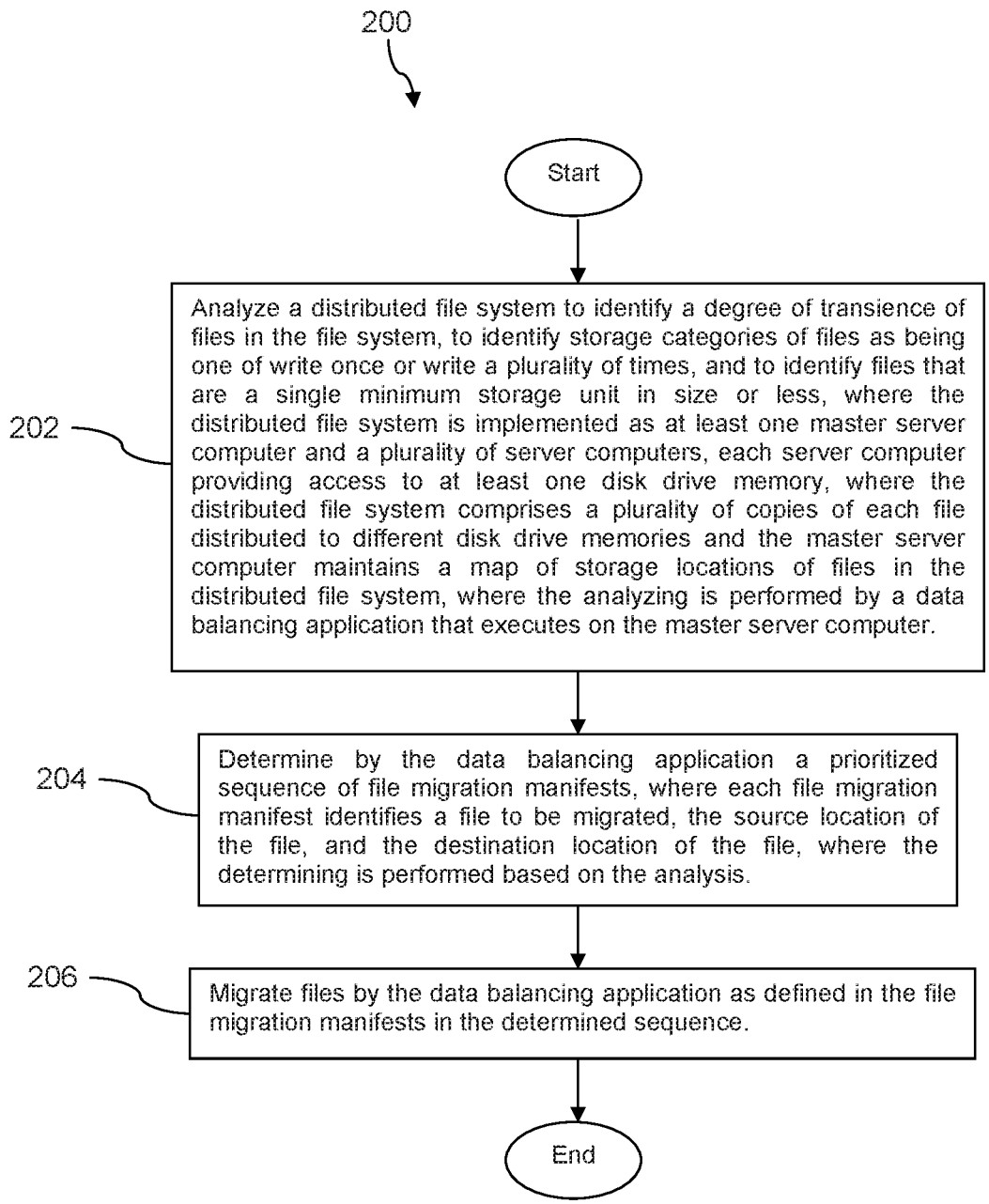
FIG. 2 is a flow chart of a method according to an embodiment of the disclosure.

Turning now to FIG. 2, a method 200 is described. At block 202, a data balancing application that executes on a master server computer analyzes a distributed file system to identify a degree of transience of files in the file system, to identify storage categories of files as being one of write once or write a plurality of times, and to identify files that are a single minimum allocatable unit in size or less, where the distributed file system is implemented as at least one master server computer and a plurality of server computers, each server computer providing access to at least one disk drive memory, where the distributed file system comprises a plurality of copies of each file distributed to different disk drive memories and the master server computer maintains a map of storage locations of files in the distributed file system, where the analyzing is performed by a balancing application that executes on the master server computer. For example, the data balancing application 118 executes on the master server 110 to analyze the distributed file system 102. At block 204, the data balancing application determines a prioritized sequence of file migration manifests, where each file migration manifest identifies a file to be migrated, the source location of the file, and the destination location of the file, where the determining is performed based on the analysis. And at block 206, the data balancing application migrates files as defined in the file migration manifests in the determined sequence. In an embodiment, each file that is migrated in block 206 is migrated by a thread of execution that is launched by the data balancing application to migrate the file according to the associated manifest. The data balancing application may migrate files subject to one or more constraints, such as a constraint on the maximum amount of master server processing capacity that the migration processing may consume, such as a constraint on a percentage of migrations to perform (e.g., the top 30% of migrations, the top 50% of migrations, or some other top prioritized percentage of migrations).

Figure 3:
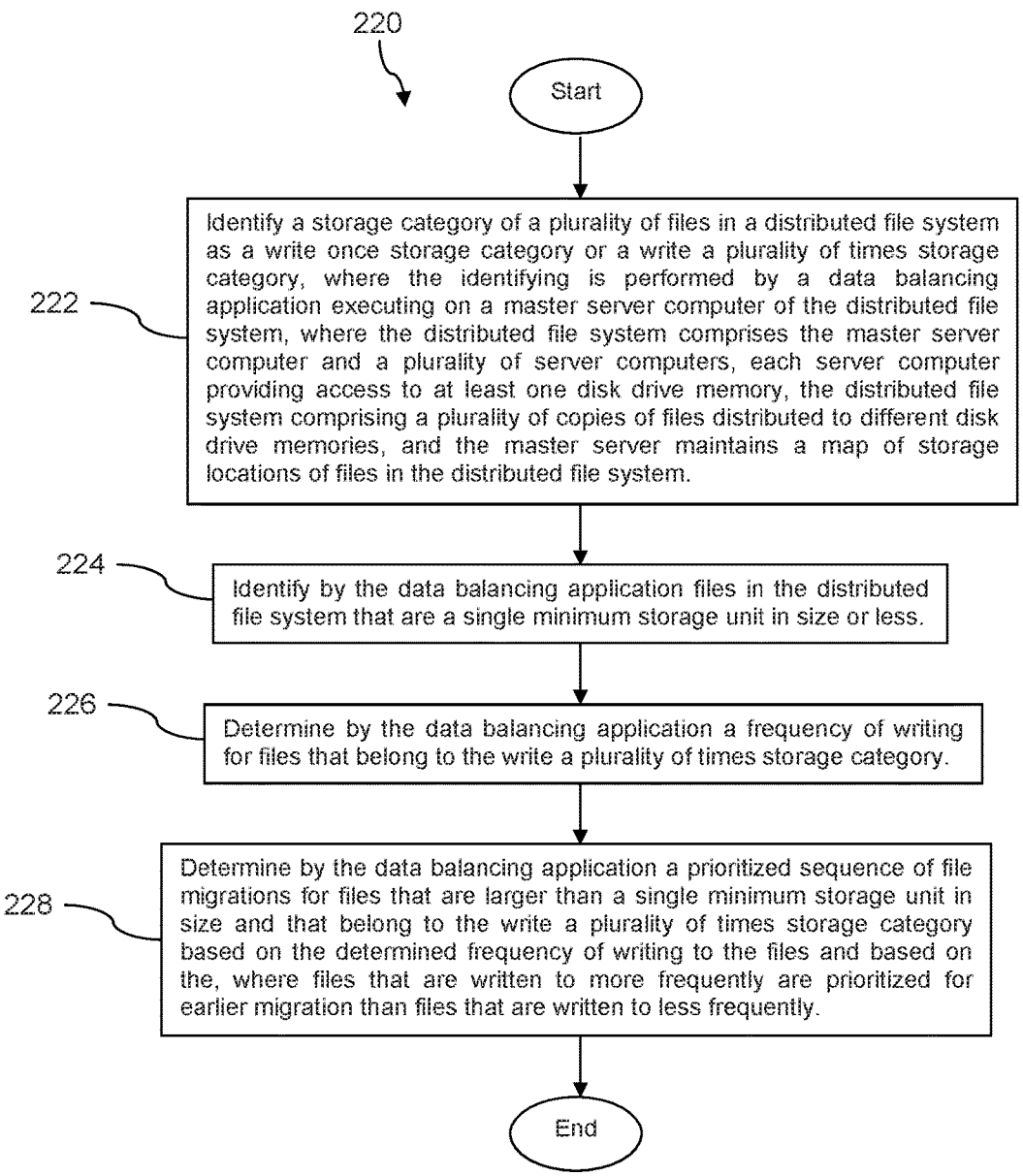
FIG. 3 is a flow chart of another method according to an embodiment of the disclosure.

Turning now to FIG. 3, a method 220 is described. At block 222, a data balancing application executing on a master server computer of a distributed file system identifies a storage category of a plurality of files in the distributed file system as a write once storage category or a write a plurality of times storage category, where the distributed file system comprises the master server computer and a plurality of server computers, each server computer providing access to at least one disk drive memory, the distributed file system comprising a plurality of copies of files distributed to different disk drive memories, and the master server maintains a map of storage locations of files in the distributed file system. For example, For example, the data balancing application 118 executes on the master server 110 to identify storage categories.

At block 224, the data balancing application identifies in the distributed file system that are a single minimum allocatable unit in size or less. For example the data balancing application 118 identifies such files. At block 226, the data balancing application determines a frequency of writing for files that belong to the write a plurality of times storage category. For example, the data balancing application 118 the frequency at which files are written to. At block 228, the data balancing application (e.g., data balancing application 118) determines a prioritized sequence of file migrations for files that are larger than a single minimum allocatable unit in size and that belong to the write a plurality of times storage category based on the determined frequency of writing to the files and based on the, where files that are written to more frequently are prioritized for earlier migration than files that are written to less frequently. After the processing of blocks 222, 224, 226, and 228 the data balancing application 118 may further process the migrations in priority order based on one or more predefined constraints.

Figure 4:
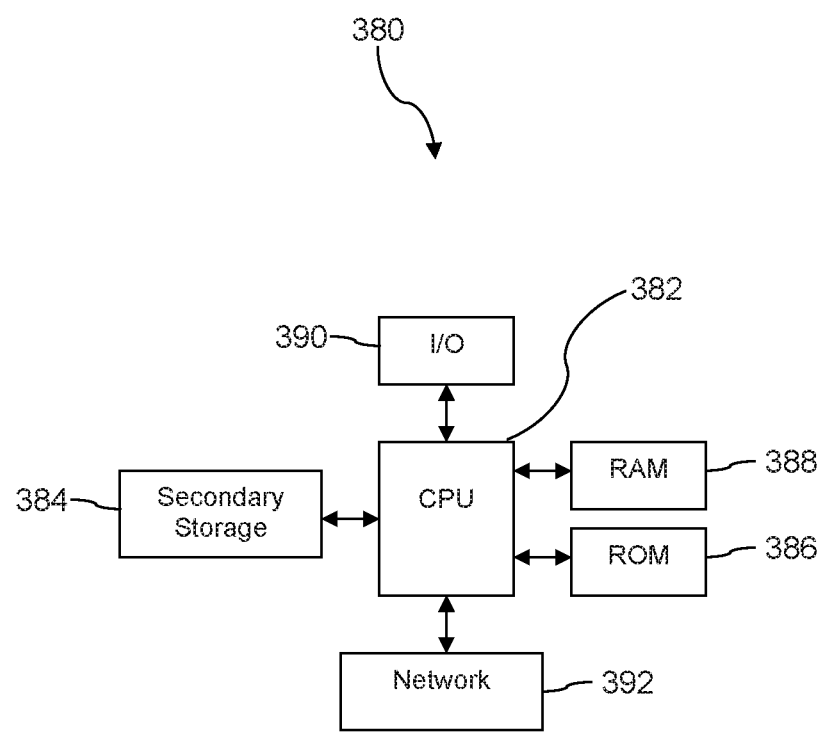
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media. I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of balancing the data stored in a distributed file system, comprising:
   identifying a storage category of a plurality of files in a distributed file system as a write once storage category or a write a plurality of times storage category, where the identifying is performed by a data balancing application executing on a master server computer of the distributed file system, where the distributed file system comprises the master server computer and a plurality of server computers, each server computer providing access to at least one disk drive memory, the distributed file system comprising a plurality of copies of files distributed to different disk drive memories, and the master server maintains a map of storage locations of files in the distributed file system;
   identifying by the data balancing application files in the distributed file system that are a single minimum allocatable unit in size or less;
   determining by the data balancing application a frequency of writing for files that belong to the write a plurality of times storage category;
   determining by the data balancing application a prioritized sequence of file migrations for files that are larger than a single minimum allocatable unit in size and that belong to the write a plurality of times storage category based on the determined frequency of writing to the files, where files that are determined to be written to more frequently are prioritized for earlier migration than files that are determined to be written to less frequently; and
   migrating the files included in the prioritized sequence according to the prioritized sequence.

2. The method of claim 1, wherein the minimum allocatable unit is 1024 bytes of data.

3. The method of claim 1, wherein the distributed file system is a Hadoop distributed file system (HDFS).

4. The method of claim 1, wherein the distributed file system is accessed by a plurality of applications executing on server computers outside of the distributed file system by calling an application programming interface (API) provided by the master server computer.

5. The method of claim 1, further comprising migrating files in the prioritized sequence of file migrations.

6. The method of claim 5, wherein migrating files is performed based on at least one of limiting processing of migrating to less than a predetermined threshold of master server computer processor time or a predefined portion less than all of the migrations.

7. A method of balancing the data stored in a distributed file system, comprising:
analyzing a distributed file system to identify a degree of transience of files in the file system, to identify storage categories of files as being one of write once or write a plurality of times, and to identify files that are a single minimum allocatable unit in size or less, where the distributed file system is implemented as at least one master server computer and a plurality of server computers, each server computer providing access to at least one disk drive memory, where the distributed file system comprises a plurality of copies of each file distributed to different disk drive memories and the master server computer maintains a map of storage locations of files in the distributed file system, where the analyzing is performed by a data balancing application that executes on the master server computer;
identifying by the data balancing system a subset of files to be migrated based on the analysis of the distributed file system;
determining by the data balancing application file migration manifests for the subset of files, where each file migration manifest identifies a file to be migrated, a source location of the file, and a destination location of the file;
determining by the data balancing application a prioritized sequence of the file migration manifests, based on the analysis and based on the maintained map; and
migrating the subset of files by the data balancing application as defined in the file migration manifests in the determined prioritized sequence, wherein each file is migrated by a thread of execution that is launched by the data balancing application to migrate the file according to the associated manifest.

8. The method of claim 7, wherein the distributed file system is a Hadoop distributed file system (HDFS).

9. The method of claim 7, wherein the distributed file system comprises two master server computers.

10. The method of claim 7, wherein the data balancing application further migrates files based on restricting the migration processing burden on the master server computer below a threshold.

11. The method of claim 7, wherein the data balancing application further migrates files based on a predefined percentage of migration manifests.

12. The method of claim 7, wherein the analyzing the distributed file system comprises determining a file dispersion metric of the distributed file system and wherein determining the prioritized sequence of the file migration manifests and migrating the subset of files is triggered by the file dispersion metric exceeding a predefined threshold.

13. The method of claim 7, wherein determining the prioritized sequence of the file migration manifests and migrating the subset of files is performed on a periodic basis.

14. A master server computer system for mediating access to and for balancing data in a distributed file system, comprising:
a non-transitory memory;
at least one processor; and
a data balancing application stored in the non-transitory memory that, when executed by the processor,
analyzes a distributed file system to identify a degree of transience of files in the file system, to identify storage categories of files in the file system as being one of write once or write a plurality of times, and to identify files that are a single minimum allocatable unit in size or less, where the distributed file system comprises a plurality of server computers, each server computer providing access to at least one disk drive memory, where the distributed file system comprises a plurality of copies of each file distributed to different disk drive memories, where the master server computer system maintains in the non-transitory memory a map of storage locations of files in the distributed file system,
identifies a subset of files to be migrated based on the analysis of the distributed file system,
determines file migration manifests for the subset of files, where each file migration manifest identifies a file to be migrated, a source location of the file, and a destination location of the file, where files being of the write once storage category are not provided a file migration manifest,
determines a prioritized sequence of the file migration manifests based on the analysis, and
migrates the subset of files as defined in the file migration manifests in the determined prioritized sequence.

15. The system of claim 14, wherein the data balancing application further analyzes the distributed file system to determine a file dispersion metric of the file system.

16. The system of claim 15, wherein the file dispersion metric is determined based on the locations of copies of the same files with reference to location of the copies on disk drive memories coupled to the same server computers and based on the locations of copies of the same files with reference to location of the copies on disk drive memories coupled to different server computers located in a same equipment rack.

17. The system of claim 15, wherein the data balancing application triggers itself to determine the prioritized sequence of the file migration manifests and to migrate the subset of files based on the file dispersion metric one of exceeding or dropping below a predefined dispersion threshold.

18. The system of claim 14, wherein the distributed file system comprises a Hadoop distributed file system (HDFS).

19. The system of claim 14, wherein the distributed file system comprises in excess of one petabyte (1 million gigabytes) of data.

20. The system of claim 14, wherein computing is performed on some of the data in the disk drive memory by application software executing on the server computers.

* * * * *